United States Patent [19]
Choi

[11] Patent Number: 6,008,725
[45] Date of Patent: Dec. 28, 1999

[54] DEVICE FOR SEQUENTIALLY TURNING ON BRAKE LAMPS OF CAR

[75] Inventor: Sung Moo Choi, Seoul, Rep. of Korea

[73] Assignee: Kia Motors Corporation, Seoul, Rep. of Korea

[21] Appl. No.: 08/710,468

[22] Filed: Sep. 18, 1996

[30] Foreign Application Priority Data

Aug. 22, 1996 [KR] Rep. of Korea ...................... 96-34811

[51] Int. Cl.$^6$ ................................................. B60Q 1/44
[52] U.S. Cl. ........................................... 340/479; 340/641
[58] Field of Search ................................... 340/479, 463, 340/464, 467, 459, 640, 641, 642, 331, 332, 478, 932; 200/61–89, 86.5

[56] References Cited

U.S. PATENT DOCUMENTS

| | | | |
|---|---|---|---|
| 3,019,415 | 1/1962 | Marion, Sr. ............................. | 340/479 |
| 3,329,936 | 7/1967 | Nallinger ................................. | 340/479 |
| 4,072,362 | 2/1978 | Van Anrooy ............................... | 303/9 |
| 4,575,706 | 3/1986 | Heidman, Jr. ............................ | 340/641 |
| 5,150,098 | 9/1992 | Rakow .................................... | 340/479 |
| 5,390,987 | 2/1995 | Willi et al. ............................ | 303/9.62 |

*Primary Examiner*—Brent A. Swarthout
*Assistant Examiner*—Van T. Trieu

[57] ABSTRACT

A brake lamp device operatively connected to the brake of a car used to decrease the speed of the running car or stop the car, which sequentially turns on a plurality of brake lamps in response to pressure applied to a brake pedal. The brake lamp device includes a plurality of brake lamps attached to the rear surface of the car at either side of the car, a diaphragm hydraulically connected to a master cylinder of the car generating a brake driving pressure, the diaphragm being applied with the brake driving pressure, and a pressure sensor unit adapted to receive the brake driving pressure via the diaphragm, thereby sequentially turning on the brake lamps in accordance with the brake driving pressure. The brake lamp device can surely inform to drivers of following cars of whether the turning-on of the brake lamps is associated with a decrease in the speed of the car or an abrupt stopping of the car. Accordingly, it is possible to surely inform of the braking state of the car so that drivers of following cars can cope with the braking state of the car.

3 Claims, 4 Drawing Sheets

DEVICE FOR SEQUENTIALLY TURNING ON BRAKE LAMPS OF CAR

BACKGROUND OF THE INVENTION

1. Field of the Invention

The present invention relates to a brake lamp device operatively connected to the brake of a car used to decrease the speed of the running car or stop the car, and more particularly to a device for sequentially turning on a plurality of brake lamps in response to pressure applied to a brake pedal.

2. Description of the Prior Art

Typically, brake lamps attached to the rear surface of a car turn on when the driver depresses down a brake pedal of the car. As the brake lamps turn on, cars following the car are informed of the intention that the car will decrease in speed or that the car will stop.

Such brake lamps have a switch having a snap type construction or a hydraulic type construction. Where the switch has the snap type construction, its contacts are closed by a spring when the brake pedal is depressed. On the other hand, the switch having a hydraulic type construction is illustrated in FIG. 1. In this case, contacts of the switch are closed when the internal hydraulic pressure of a master cylinder 50 filled with brake oil increases, thereby pushing a diaphragm 51.

However, conventional devices for turning on brake lamps only have a function to simply turn on and off a single brake lamp via a switch as mentioned above. For this reason, it is impossible to check whether the turning-on of the brake lamp is associated with a decrease in the speed of the car or an abrupt stopping of the car.

As a result, many accidents have occurred because it is impossible to rapidly recognize an abrupt stopping of forward cars only from turn-on brake lamps.

SUMMARY OF THE INVENTION

Therefore, an object of the invention is to solve the above-mentioned problem involved in the prior art and to provide a brake lamp device for sequentially turning on brake lamps of a car, which is capable of surely informing of the operating state of the brake via the brake lamps to following cars so as to prevent the car from coming into collision with the following cars, thereby achieving safe driving of the car.

In accordance with the present invention, this object is accomplished through a brake lamp device for a car comprising: a plurality of brake lamps attached to the rear surface of the car at either side of the car; a diaphragm hydraulically connected to a master cylinder of the car generating a brake driving pressure, the diaphragm being applied with the brake driving pressure; and a pressure sensor unit adapted to receive the brake driving pressure via the diaphragm, thereby sequentially turning on the brake lamps in accordance with the brake driving pressure.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
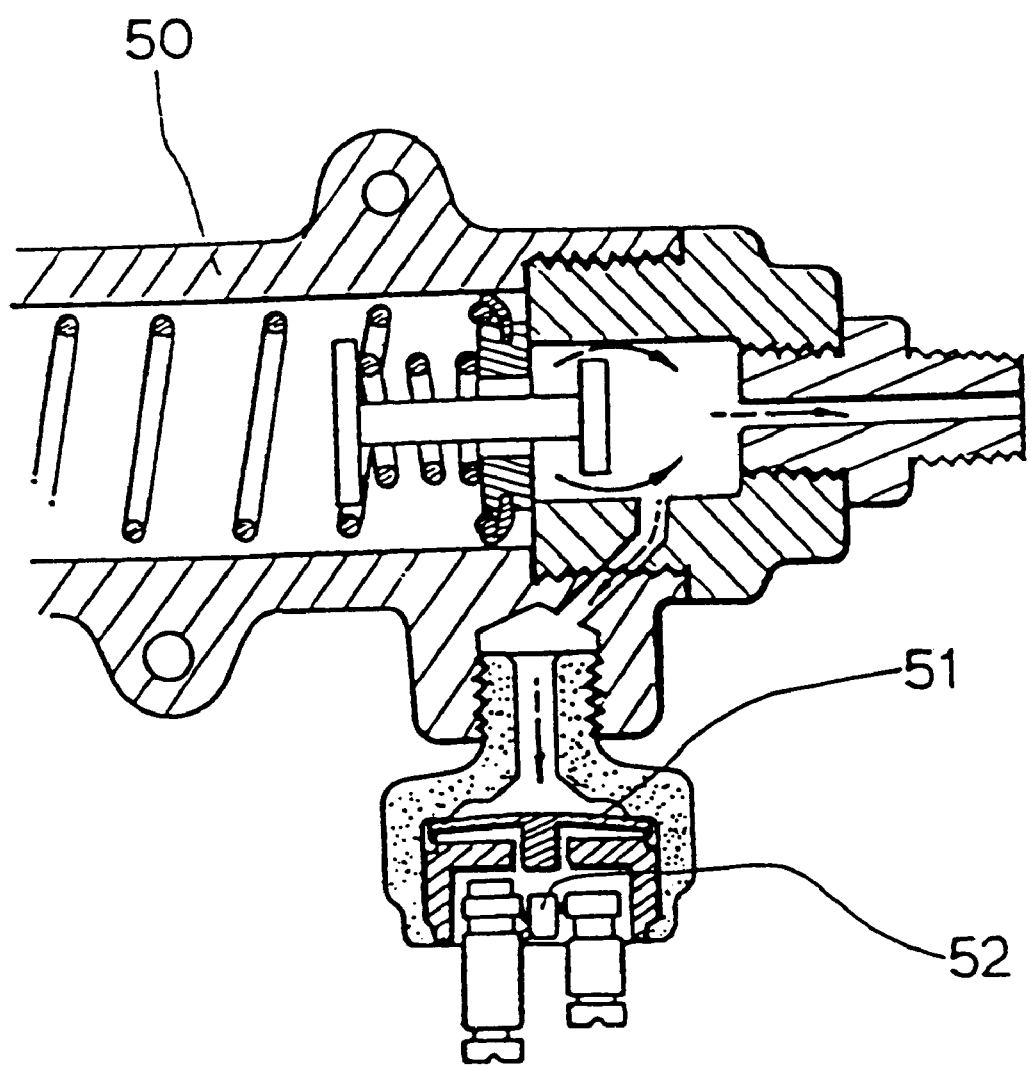
FIG. 1 is a sectional view illustrating a hydraulic type switch construction for brake lamps, which is applied to the present invention.
Figure 2:
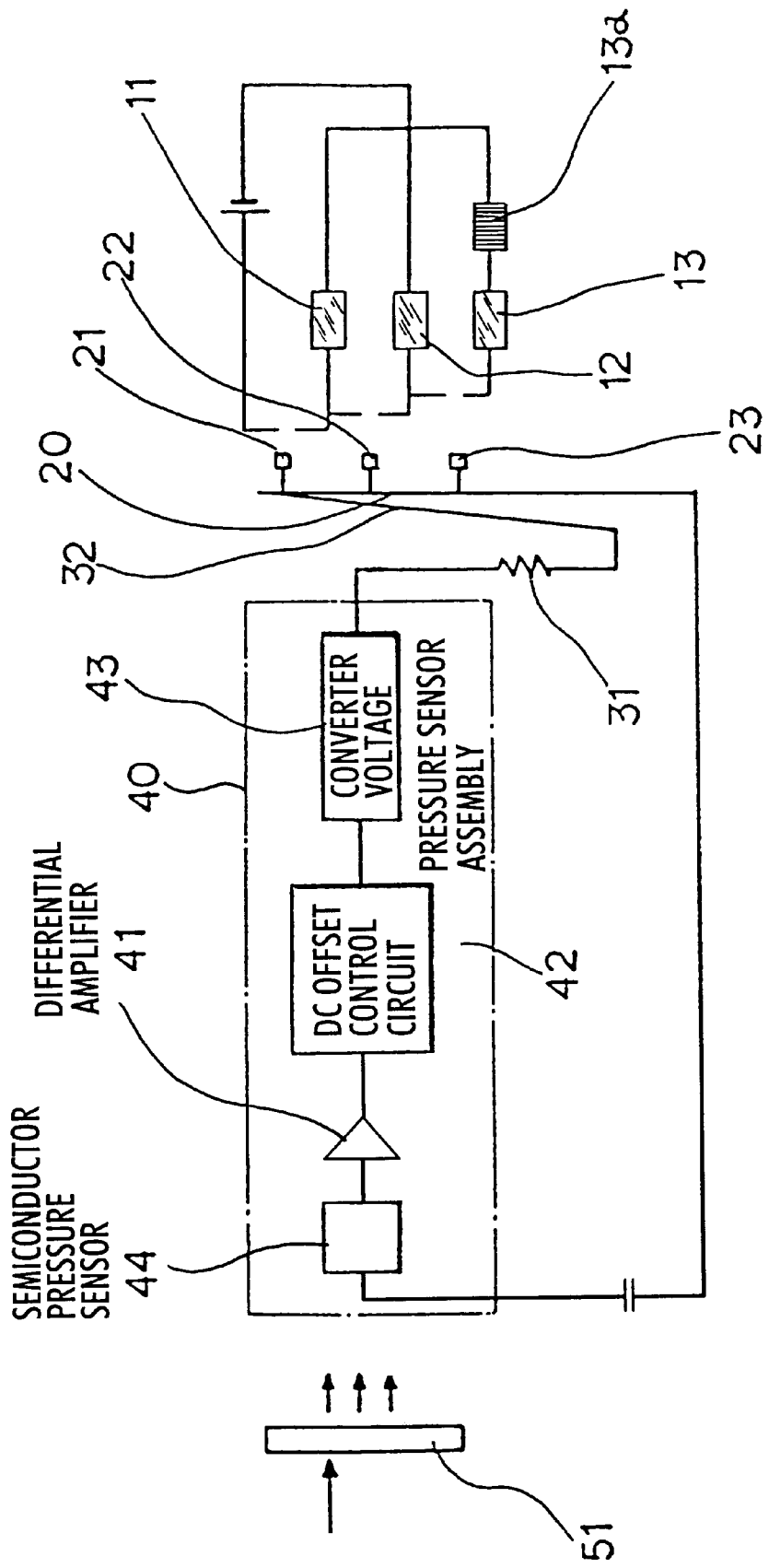
FIG. 2 is a circuit diagram illustrating a brake lamp device in accordance with the present invention.
Figure 3A:
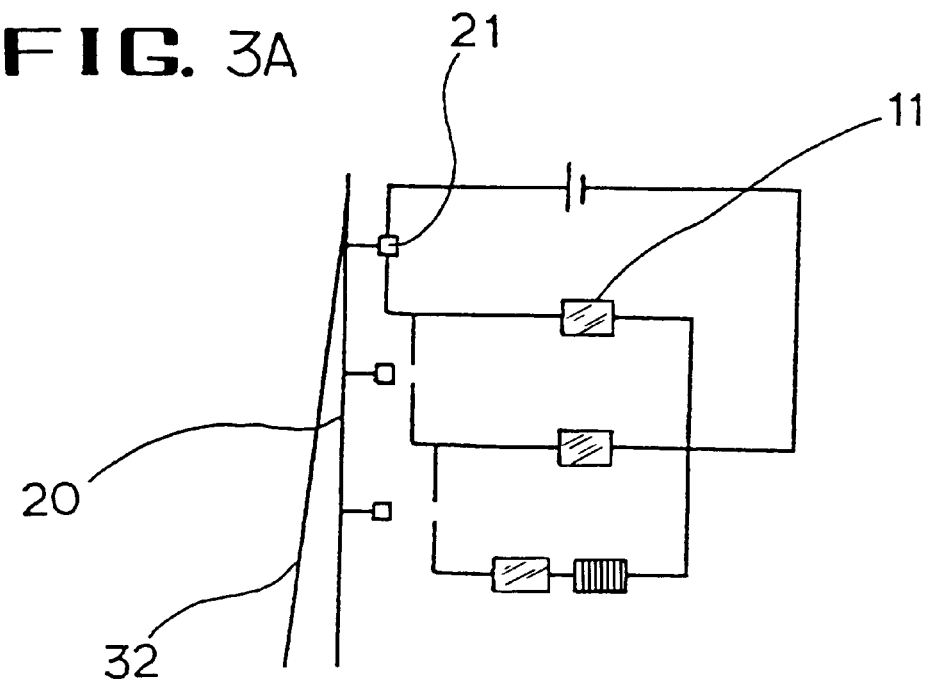
FIGS. 3A to 3C are circuit diagrams respectively illustrating different operating states of the brake lamp device according to the present invention.
Figure 3B:
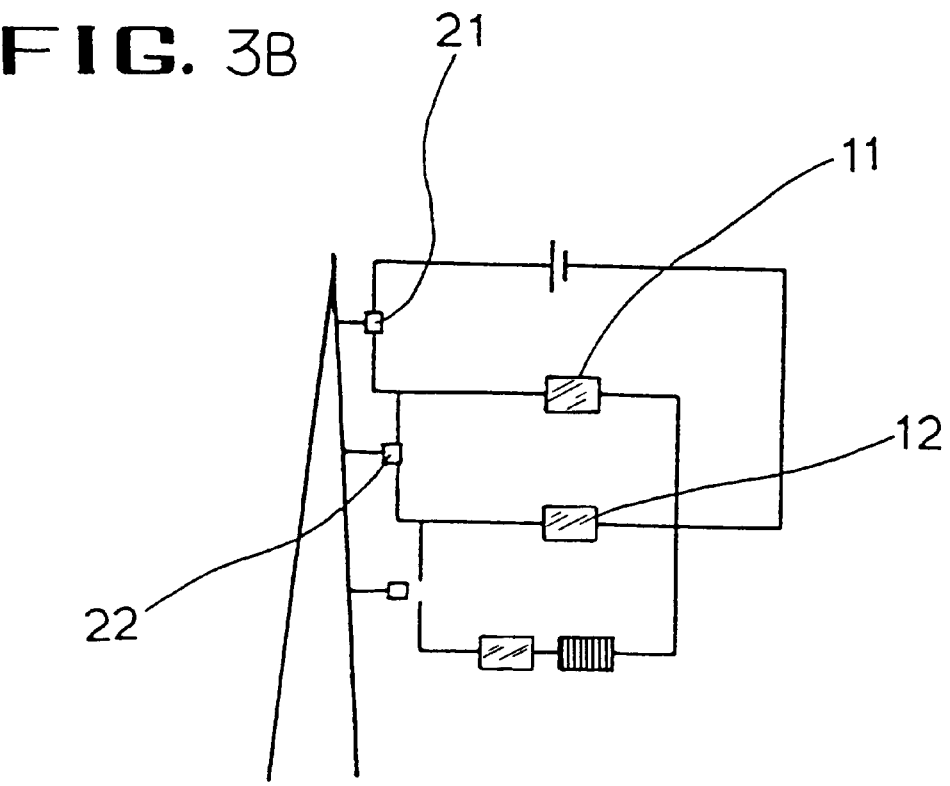
Figure 3C:
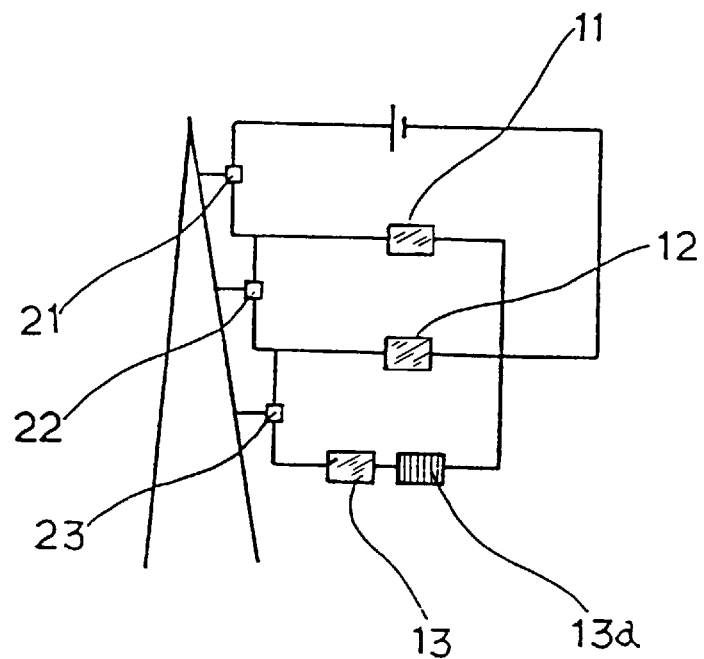
Figure 4:
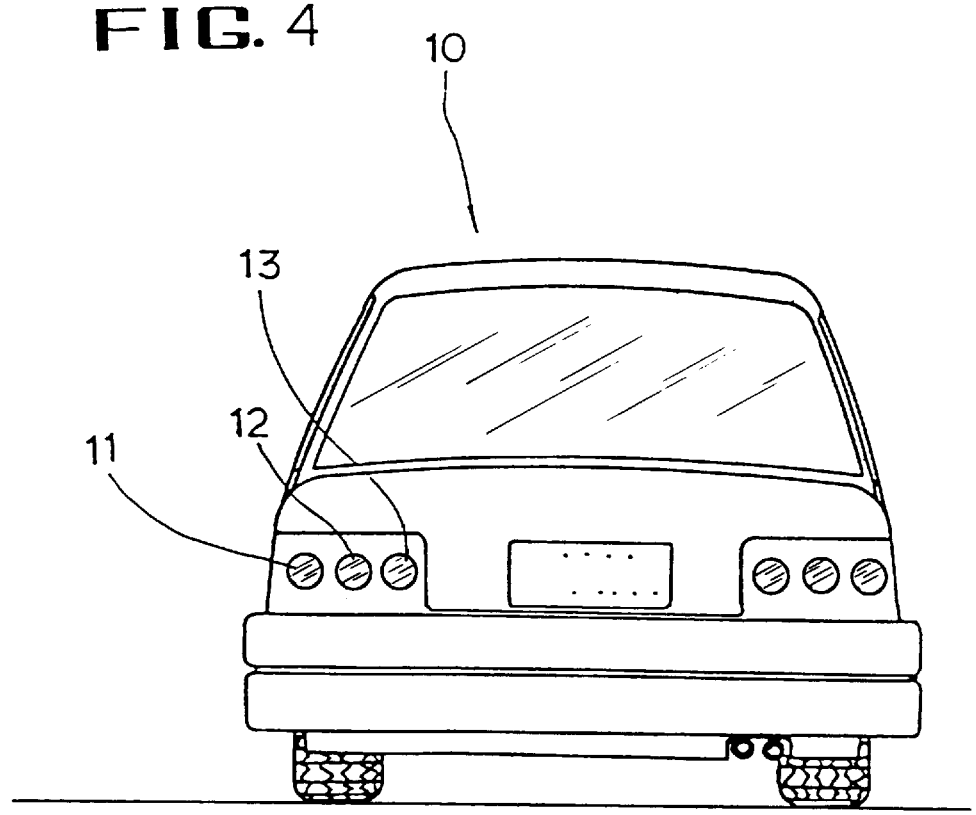
FIG. 4 is a rear view illustrating a car to which the brake lamp device is applied.

FIGS. 2 to 4 illustrate a brake lamp device for sequentially turning on brake lamps of a car in accordance with an embodiment of the present invention.

As shown in FIGS. 2 to 4, the device includes a plurality of brake lamps 11 to 13 attached to the rear surface of the car at either side of the car. The device also includes a master cylinder 50 in which a pressure sensor assembly 40 is disposed. The pressure sensor assembly 40 is applied with pressure from a diaphragm 51 which is hydraulically connected to the master cylinder 50. The pressure sensor assembly 40 serves to sequentially turn on the brake lamps 11 to 13 in accordance with the actuating pressure of the brake.

In accordance with the illustrated embodiment of the present invention, the pressure sensor assembly 40, which receives pressure transmitted by the diaphragm 51, includes a differential amplifier 41 for amplifying a pressure signal indicative of the pressure transmitted by a semiconductor pressure sensor 44, a DC offset control circuit 42 for converting the amplified pressure signal into a voltage signal, and a current/voltage [V/I] converter 43 for converting the voltage signal into a current signal. The semiconductor pressure sensor 44 uses the principle of piezo electricity of semiconductor resistance. The electrical signal is generated by the semiconductor pressure sensor 44 and amplified by the differential amplifier 41. This circuit is illustrated in FIG. 2. As shown in FIG. 2, a pair of heating wires 31 and 32 are connected in series to the pressure sensor assembly 40. A moving member 20 having a plurality of switch contacts 21 to 23 respectively corresponding to the brake lamps 11 to 14 is coupled to the second heating wire 32 so as to turn on and off the brake lamps 11 to 13. A flasher assembly 13a is also connected to a selected one of the brake lamps, for example, the innermost brake lamp 13 to turn on and off the brake lamp 13.

When the brake pedal is depressed to brake the car, the diaphragm 51 is pushed by the hydraulic pressure of brake oil filled in the master cylinder 50. This pressure applied to the diaphragm 51 is transmitted to the differential amplifier 41 which, in turn, amplifies the pressure signal received thereto.

The amplified pressure signal is then converted into a DC voltage signal by the DC offset control circuit 42. The DC voltage signal from the DC offset control circuit 42 is sent to the [V/I] converter 43 which, in turn, converts the DC voltage signal into a current signal. The current from the pressure sensor assembly 40 is sent to the second heating wire 32 via the first heating wire 31, thereby causing the second heating wire 32 to linearly expand. As a result, the moving member 20 connected to the second heating wire 32 moves.

As the moving member 20 moves, the switch contacts 21 to 23 are closed, thereby turning on the associated brake lamps 11 to 13. At this time, the switch contacts 21 to 23 are closed in a sequential manner in accordance with the moved length of the moving member 20.

That is, when the moved length of the moving member 20 is relatively short as the depressing pressure applied to the brake pedal, namely, the hydraulic pressure applied to the diaphragm 51 is relatively small, only the first switch contact 21 is closed. In this case, only the first brake lamp 11 turns on. When the brake pedal is depressed by a more or less strong foot force, the hydraulic pressure exerted on the diaphragm 51 and pressure sensor assembly 40 becomes higher, thereby causing the expansion of the heating wires 31 and 32 to increase. As a result, the movement of the moving member 20 increases as shown in FIG. 3B, thereby closing the second switch contact 22 as well as the first switch contact 21. In this case, both the first and second brake lamps 11 and 12 turn on.

When the hydraulic pressure exerted on the diaphragm 51 and pressure sensor assembly 40 is maximum as the brake pedal is depressed by a maximum foot force, the expansion of the heating wires 31 and 32 becomes maximum. As a result, the movement of the moving member 20 increases to a maximum, thereby closing all switch contacts 21 to 23 as shown in FIG. 3C. In this case, all brake lamps 11 to 13 turn on. In particular, the innermost brake lamp 13 connected to the flasher assembly 13a flickers, thereby informing of an abrupt braking of the car to following cars.

On the other hand, when the foot force is released from the brake pedal, the pressure applied to the diaphragm 51 and pressure sensor assembly 40 is released, thereby cutting off the supplying of current to the heating wires 31 and 32. As a result, the moving member 20 returns to its original position at which the switch contacts 21 to 23 are open. In this state, all brake lamps 11 to 13 turn off.

As apparent from the above description, the present invention provides a device for sequentially turning on brake lamps in accordance with an operating state of the brake pedal, thereby surely informing to drivers of following cars of whether the turning-on of the brake lamps is associated with a decrease in the speed of the car or an abrupt stopping of the car. In accordance with the present invention, it is possible to surely inform of the braking state of the car so that drivers of following cars can cope with the braking state of the car. Accordingly, the device of the present invention achieves safe driving of the car and following cars.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A brake lamp device for a car comprising:

a plurality of brake lamps attached to a rear facing surface of the car at either side of the car;

a diaphragm hydraulically connected to a master cylinder of the car generating a brake driving pressure, the diaphragm being applied with the brake driving pressure; and a pressure sensor assembly including a pair of heating wires and a moving member adapted to receive the brake driving pressure via the diaphragm, thereby sequentially turning on the brake lamps in accordance with the brake driving pressure using said pair of heating wires adapted to linearly expand upon receiving current and said moving member connected to the heating wires and adapted to linearly expand upon receiving the current.

2. The device in accordance with claim 1, wherein the pressure sensor assembly comprises:

a differential amplifier for amplifying a pressure signal;

a DC offset control circuit for receiving the amplified pressure signal from the differential amplifier and converting the received pressure signal into voltage;

a voltage converter for receiving the voltage from the DC offset control circuit and converting the received voltage into current;

said pair of heating wires connected to the voltage converter;

said moving member having a plurality of contacts respectively associated with the brake lamps and serving to sequentially closing the contacts by the movement thereof, thereby sequentially turning on the brake lamps.

3. The device in accordance with claim 2, further comprising a flasher assembly connected to a selected one of the brake lamps adapted to flicker the selected brake lamp.

* * * * *